Feb. 25, 1947.  A. G. ZIMMERMAN  2,416,606
FILM DRIVING MECHANISM
Filed May 26, 1944
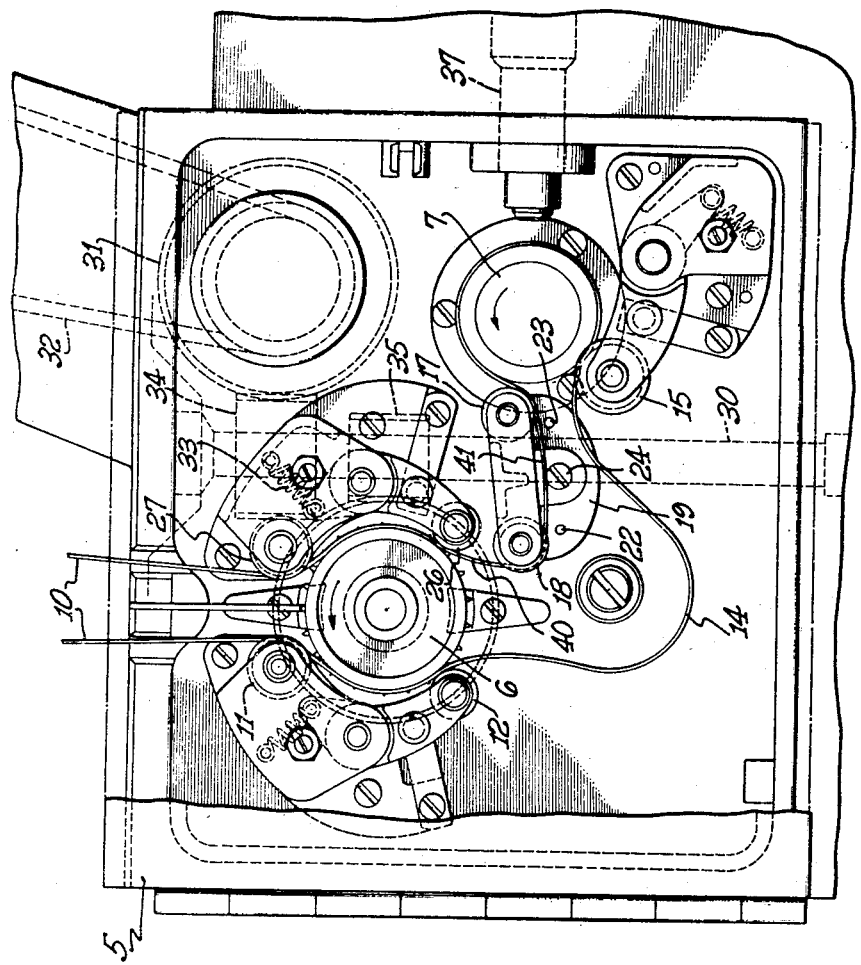
ARTHUR G. ZIMMERMAN,
INVENTOR.
BY
ATTORNEY.

Patented Feb. 25, 1947

2,416,606

UNITED STATES PATENT OFFICE 2,416,606

FILM DRIVING MECHANISM

Arthur G. Zimmerman, Indianapolis, Ind., assignor to Radio Corporation of America, a corporation of Delaware Application May 26, 1944, Serial No. 537,453

7 Claims. (Cl. 271—2.3)

This invention relates to sound film apparatus, and particularly to a film feeding or advancing mechanism to provide constant uniform film motion at a specific point in a sound recorder or reproducer.

Many types of motion picture film drives are known in the art, such as those in which a film driving sprocket advances the film over a film pulled roller, the roller being mounted on a shaft with a fly-wheel or rotary stabilizer. In the past, resiliently damped idler or film loop rollers between the drive sprocket and the film pulled drum or roller have usually been employed to prevent speed variations of the drive sprocket from affecting the speed of the film over the drum. These prior systems have required considerable space to accommodate the film drive mechanisms with their mechanical filters and the over-all unit has, therefore, been of considerable size. Such units were, and are satisfactory for recorders permanently mounted in fixed positions. To make film recorders portable, it is desirable to reduce their size which makes it necessary to use all space to the optimum advantage. Thus, it must be done without sacrificing quality in the form of less uniform film motion at the translation points.

The present invention, therefore, is directed to a mechanism which provides a desirable film advancing path between a closely adjacent drive sprocket and the film driven roller or drum. The film path is such as to introduce into the film the necessary travel to provide a uniform motion of the film over the drum on which the sound is recorded. In brief, this is accomplished by a pair of fixedly mounted rollers which provide a substantially maximum film wrap around the recording drum to obtain the optimum frictional contact between drum and film, the proper direction of approach for the film onto the drive sprocket, and the necessary filter film loops between the drive sprocket and film pulled roller. By directing the film in the manner described hereinafter, a very uniform film motion is obtainable, and one which is comparable to that obtainable with the larger stationary equipments.

The principal object of the invention, therefore, is to facilitate the obtaining of a uniform film motion at a translation point.

Another object of the invention is to provide a filtered film path between a drive sprocket and film pulled drum located adjacent one another.

A further object of the invention is to provide an improved method and means for obtaining a plurality of film loops into a film between a drive sprocket and film pulled drum to prevent sprocket irregularities from being introduced into the motion of the film over the drum.

A still further object of the invention is to provide a film path having a plurality of film loops intermediate a drive sprocket and a film pulled roller located closely adjacent one another.

Although the novel features which are believed to be characteristic of this invention will be pointed out with particularity in the appended claims, the manner of its organization and the mode of its operation will be better understood by referring to the following description read in conjunction with the accompanying drawing forming a part hereof, in which the single figure is an elevational view of a sound recorder embodying the invention, the figure showing solely the film path within the recorder and the film drive guiding elements for obtaining it.

Referring now to the drawing, a casing 5 has mounted on the back wall thereof a rotatable drive sprocket 6 and a film pulled drum 7, the latter having either a solid fly-wheel or a rotary stabilizer mounted on the other end of its shaft. The film 10 is adapted to be supplied from a supply reel, not shown, and advanced around the left-hand side of sprocket 6 while guided by a fixed axis pad roller 11 and an adjustable axis pad roller 12. The film then passes in a loop 14 to the film drum 7 over a pressure roller 15.

The film is made to almost completely wrap around the roller 7 by a fixed axis roller 17 mounted on a bracket 19 doweled to the back wall of the casing by dowels 22 and 23, and fastened to the wall by a screw 24. From the roller 17, the film is directed by a fixed axis roller 18, mounted on the other end of bracket 19, to the right-hand side of sprocket 6 under adjustable axis pad roller 26, the film leaving the sprocket under a fixed axis pad roller 27 to a take-up reel, not shown. It will be noted that the axes of the rollers 17 and 18 lie in a plane at substantially 25 degrees to the plane in which the axes of sprocket 6 and drum 7 lie.

By the dotted lines 30, a drive shaft for a gear 31 which drives a belt 32 for the take-up reel, is indicated, a worm 34 driving the gear 31 and a worm 35 driving the sprocket gear. Shown to the right of the casing and extending through a wall thereof is an optical unit 37 for projecting light on the film 10 as it passes over the drum 7, the light beam being modulated in accordance with sound waves in any well-known manner. The pad roller mechanisms shown at 11, 12, 15, 26, and 27 are described in detail and claimed in my copending application, Ser. No. 537,454, filed May 26, 1944, and will not be further described herein except to state that the rollers 12, 15, and 26 are movable away from the sprocket and roller for the purpose of threading the film thereon.

As mentioned above, the film path provided wraps the film almost completely around the roller or drum 7 to obtain the greatest friction between the film and drum. Furthermore, the film is directed onto the sprocket 6 substantially tangentially to avoid a film pull on the roller 26 which would tend to pull it away from the sprocket, the roller 26 being resiliently held in operative position by a spring 38. Without the rollers 17 and 18 positioned as shown, or with a single roller, less wrap is obtainable around roller 7, while the film would be pulled by the sprocket 6 more nearly parallel with a line connecting the axes of the sprocket 6 and the roller 26.

The third advantage of this film path is that there is provided a film loop at 40 and a second film loop at 41, both of which are located between the sprocket 6 and the roller 7, and both of which aid in eliminating irregularities introduced into the film by the sprocket 6, since the loops are in series. The large loop 14, of course, prevents such irregularities from being transmitted to the roller 7 through the other film path. This arrangement, therefore, permits the positioning of the roller 7 at a minimum distance with respect to the sprocket 6 to reduce the over-all dimensions of a portable recorder, while providing a film motion having a uniformity comparable to that of large permanent equipments.

I claim as my invention:

1. A film drive mechanism comprising a drive sprocket, a pad roller for holding film on said sprocket, a film pulled drum closely adjacent said sprocket, fixed rollers for directing said film between said sprocket and said drum to provide a plurality of film loops in the tensioned path of said film between said sprocket and drum, one of said rollers being positioned adjacent said sprocket and pad roller to direct said film tangentially onto said sprocket at the point of contact of said film with said pad roller, and means for forming film into a soft loop on the feed side to said drum.

2. A film advancing mechanism comprising a sprocket adapted to advance films on two sides thereof, a pad roller on said sprocket, a film pulled drum adapted to have film pulled thereover by said sprocket, and a plurality of fixed rollers intermediate said sprocket and said drum on the tensioned side of the film path between said sprocket and said drum, one of said rollers being positioned adjacent said drum for providing a substantially maximum wrap of said film over said drum, and another of said rollers being positioned adjacent said sprocket for directing said film substantially tangentially toward said sprocket at the point of contact of said film with said pad roller.

3. A film advancing mechanism for maintaining a uniform motion of said film at a light translation point comprising a drive sprocket for advancing film in opposite directions on each side thereof, a pad roller on said sprocket, a drum adapted to be rotated by film pulled thereover by said sprocket, said sprocket and drum being colsely adjacent one another, a fixed bracket between said sprocket and said drum, and a pair of rollers on said bracket, one of said rollers being positioned adjacent said drum for providing a substantially complete wrap of said film around said drum, and the other of said rollers being positioned adjacent said sprocket for directing said film substantially tangentially toward said sprocket at the point of contact of said film with said pad roller.

4. A film advancing mechanism in accordance with claim 3 in which said fixed intermediate rollers introduce a pair of film loops in series between said sprocket and said drum, and means are provided for forming a third loop in the other film path between said sprocket and said drum.

5. A film advancing mechanism in accordance with claim 3 in which the axes of said rollers lie in a plane substantially 25 degrees to the plane in which the axes of said sprocket and drum lie.

6. Mechanism for obtaining a film path between a sprocket and a film pulled drum, comprising a support for positioning said sprocket and drum closely adjacent one another, a pad roller for said sprocket, a bracket mounted on said support, a roller for directing film onto said drum at a predetermined point on the surface of said drum, and a pair of rollers mounted on said bracket, one of said pair of rollers being positioned adjacent said last-mentioned roller for directing film off of said drum at a point on the surface of said drum to bring said film in contact with substantially all of the surface of said drum, and said other roller of said pair being positioned adjacent said sprocket for directing film substantially tangentially onto said sprocket at the point of contact of said film with said pad roller.

7. Mechanism in accordance with claim 6 in which the plane of the axes of said pair of rollers lies at an angle of substantially 25 degrees to the plane of the axes of said sprocket and drum.

ARTHUR G. ZIMMERMAN.

REFERENCES CITED

The following references are of record in the file of this patent:

UNITED STATES PATENTS

| Number | Name | Date |
|---|---|---|
| 1,780,681 | Kellogg | Nov. 4, 1930 |
| 1,756,864 | Hoxie | Apr. 29, 1930 |
| 1,899,571 | Kellogg | Feb. 28, 1933 |
| 2,033,277 | Elmer et al. | Mar. 10, 1936 |
| 2,248,106 | McNabb | July 8, 1941 |

FOREIGN PATENTS

| Number | Country | Date |
|---|---|---|
| 549,315 | British | Nov. 16, 1942 |
| 89,017 | Swedish | Feb. 11, 1937 |